United States Patent
Beck et al.

(10) Patent No.: US 12,275,856 B2
(45) Date of Patent: Apr. 15, 2025

(54) FAST DRYING INKJET INK COMPOSITIONS

(71) Applicant: Avery Dennison Corporation, Mentor, OH (US)

(72) Inventors: Charles L. Beck, Gilford, NH (US); Runzhi He, Fort Mill, SC (US)

(73) Assignee: Avery Dennison Corporation, Mentor, OH (US)

( * ) Notice: Subject to any disclaimer, the term of this patent is extended or adjusted under 35 U.S.C. 154(b) by 710 days.

(21) Appl. No.: 17/601,907

(22) PCT Filed: Mar. 19, 2020

(86) PCT No.: PCT/US2020/023503
§ 371 (c)(1),
(2) Date: Oct. 6, 2021

(87) PCT Pub. No.: WO2020/214323
PCT Pub. Date: Oct. 22, 2020

(65) Prior Publication Data
US 2022/0204794 A1    Jun. 30, 2022

Related U.S. Application Data

(60) Provisional application No. 62/835,157, filed on Apr. 17, 2019.

(51) Int. Cl.
| | |
|---|---|
| *C09D 11/033* | (2014.01) |
| *B41M 5/00* | (2006.01) |
| *C09D 11/037* | (2014.01) |
| *C09D 11/107* | (2014.01) |
| *C09D 11/322* | (2014.01) |
| *C09D 11/36* | (2014.01) |
| *C09D 11/40* | (2014.01) |

(52) U.S. Cl.
CPC ........... *C09D 11/40* (2013.01); *B41M 5/0023* (2013.01); *C09D 11/033* (2013.01); *C09D 11/037* (2013.01); *C09D 11/107* (2013.01); *C09D 11/322* (2013.01); *C09D 11/36* (2013.01)

(58) Field of Classification Search
CPC ....... C09D 11/40; C09D 11/36; C09D 11/033; C08G 59/38
See application file for complete search history.

(56) References Cited

U.S. PATENT DOCUMENTS

| | | |
|---|---|---|
| 3,330,330 A | 7/1967 | Sanderson |
| 6,099,631 A | 8/2000 | Tregub et al. |
| 6,281,267 B2 | 8/2001 | Parazak |
| 6,300,391 B2 | 10/2001 | Parazak et al. |
| 6,368,399 B1 | 4/2002 | Aoba et al. |
| 6,391,507 B1 | 5/2002 | Macholdt et al. |
| 6,395,079 B1 | 5/2002 | Sano |
| 6,406,528 B1 | 6/2002 | Macholdt et al. |
| 6,551,392 B1 | 4/2003 | Otaki et al. |
| 6,607,266 B2 | 8/2003 | Katsuragi et al. |
| 6,627,364 B2 | 9/2003 | Kiguchi et al. |
| 6,843,840 B2 | 1/2005 | Kataoka et al. |
| 6,929,689 B2 | 8/2005 | Nakatsu et al. |
| 6,997,979 B2 | 2/2006 | Bauer et al. |
| 7,014,698 B2 | 3/2006 | Mizutani et al. |
| 7,125,447 B2 | 10/2006 | Sugita et al. |
| 7,132,013 B2 | 11/2006 | Mizutani et al. |
| 7,132,014 B2 | 11/2006 | Mizutani et al. |
| 7,156,909 B2 | 1/2007 | Oyanagi et al. |
| 7,204,873 B2 | 4/2007 | Bauer et al. |
| 7,217,315 B2 | 5/2007 | Bauer et al. |
| 7,294,186 B2 | 11/2007 | Bauer et al. |
| 7,393,398 B2 | 7/2008 | Sugita et al. |
| 7,396,864 B2 | 7/2008 | Salenbien |
| 7,411,008 B2 | 8/2008 | Tucker et al. |
| 7,625,440 B2 | 12/2009 | Wynants et al. |
| 7,655,713 B2 | 2/2010 | Kaneko et al. |
| 7,678,186 B2 | 3/2010 | Bauer et al. |
| 7,686,443 B2 | 3/2010 | Noutary |
| 7,723,402 B2 | 5/2010 | Tucker et al. |
| 7,726,799 B2 | 6/2010 | Soroker et al. |
| 7,735,988 B2 | 6/2010 | Tiller et al. |
| 7,806,972 B2 | 10/2010 | Sugita et al. |
| 7,901,495 B2 | 3/2011 | Shikata et al. |
| 7,950,794 B2 | 5/2011 | Vanini |
| 7,993,440 B2 | 8/2011 | Shikata et al. |
| 8,251,503 B2 | 8/2012 | Kawashima |
| 8,344,046 B2 | 1/2013 | Tucker et al. |
| 8,534,821 B2 | 9/2013 | Kawashima |
| 8,544,990 B2 | 10/2013 | Kozee et al. |
| 8,586,656 B2 | 11/2013 | Shiotani et al. |
| 8,622,537 B2 | 1/2014 | Yamamoto et al. |
| 8,629,198 B2 | 1/2014 | Isobe et al. |
| 8,870,357 B2 | 10/2014 | Karnata et al. |

(Continued)

FOREIGN PATENT DOCUMENTS

| | | |
|---|---|---|
| CN | 103857758 | 6/2014 |
| EP | 1191077 | 3/2002 |

(Continued)

OTHER PUBLICATIONS

International Preliminary Report on Patentability dated Sep. 28, 2021 issued in corresponding IA No. PCT/US2020/023503 filed Mar. 19, 2020.

International Search Report and Written Opinion dated Jun. 19, 2020 issued in corresponding IA No. PCT/US2020/023503 filed Mar. 19, 2020.

*Primary Examiner* — Catherine S Branch
*Assistant Examiner* — Huihong Qiao

(57) ABSTRACT

Ink compositions for inkjet printing are disclosed. The ink compositions comprise a pigment, a binder system, a solvent system, and an epoxy resin. The ink compositions have improved drying time from the time of printing to the time of lamination with an overlaminate film as compared to existing inkjet ink compositions.

19 Claims, No Drawings

(56) References Cited

U.S. PATENT DOCUMENTS

| | | |
|---|---|---|
| 8,991,996 B2 | 3/2015 | Nagase et al. |
| 9,016,202 B2 | 4/2015 | Mostowy-Gallagher et al. |
| 9,238,744 B2 | 1/2016 | Kubota et al. |
| 9,260,615 B2 | 2/2016 | Kappaun et al. |
| 9,783,689 B2 | 10/2017 | Yamada et al. |
| 10,253,198 B2 | 4/2019 | Ito et al. |
| 10,767,065 B2 | 9/2020 | Sato et al. |
| 10,781,327 B2 | 9/2020 | Kubota et al. |
| 2004/0266912 A1 | 12/2004 | Aida et al. |
| 2006/0272547 A1 | 12/2006 | Mizutani et al. |
| 2008/0119593 A1 | 5/2008 | Stramel et al. |
| 2008/0171815 A1 | 7/2008 | Groenendaal et al. |
| 2009/0143509 A1 | 6/2009 | Shikata et al. |
| 2009/0156733 A1 | 6/2009 | Uozumi et al. |
| 2009/0235843 A1 | 9/2009 | Sugita et al. |
| 2010/0047454 A1* | 2/2010 | De Voeght .............. B05D 5/00 427/256 |
| 2010/0178425 A1 | 7/2010 | Ooishi et al. |
| 2013/0209695 A1 | 8/2013 | Fukagawa |
| 2013/0310496 A1 | 11/2013 | Shiotani et al. |
| 2014/0113996 A1 | 4/2014 | Isobe et al. |
| 2015/0184012 A1 | 7/2015 | Endo et al. |
| 2015/0368486 A1 | 12/2015 | De Saint-Romain |
| 2016/0222229 A1 | 8/2016 | Yamada et al. |
| 2017/0073534 A1 | 3/2017 | Ito et al. |

FOREIGN PATENT DOCUMENTS

| | | |
|---|---|---|
| EP | 0997506 | 3/2004 |
| EP | 1038930 | 5/2004 |
| EP | 1061419 | 10/2004 |
| EP | 1551931 | 2/2006 |
| EP | 0913440 | 5/2006 |
| EP | 1070747 | 9/2006 |
| EP | 1486542 | 10/2006 |
| EP | 1048700 | 11/2006 |
| EP | 1857510 | 11/2007 |
| EP | 1367101 | 12/2007 |
| EP | 1718708 | 1/2008 |
| EP | 1739140 | 12/2008 |
| EP | 1783179 | 3/2009 |
| EP | 2105476 | 9/2009 |
| EP | 1717282 | 12/2009 |
| EP | 1749070 | 12/2009 |
| EP | 1724313 | 1/2010 |
| EP | 1811003 | 9/2010 |
| EP | 2067828 | 6/2011 |
| EP | 1865036 | 8/2011 |
| EP | 2288666 | 5/2012 |
| EP | 1403334 | 11/2012 |
| EP | 2067830 | 2/2013 |
| EP | 2554611 | 2/2013 |
| EP | 1589081 | 8/2013 |
| EP | 1559758 | 11/2013 |
| EP | 2208762 | 6/2014 |
| EP | 2354195 | 9/2014 |
| EP | 2412764 | 10/2014 |
| EP | 1528086 | 2/2016 |
| EP | 2261290 | 2/2016 |
| EP | 3199599 | 8/2017 |
| EP | 3263657 | 1/2018 |
| EP | 2736984 | 6/2018 |
| EP | 3053971 | 12/2019 |
| GB | 2123019 | 1/1984 |
| JP | 59-22972 | 2/1984 |
| JP | 07-157704 | 6/1995 |
| JP | 2002-226571 | 8/2002 |
| JP | 2009-227812 | 10/2009 |
| JP | 2015-071681 | 4/2015 |
| JP | 2016-155909 | 6/2016 |
| JP | 2017-031272 | 2/2017 |
| JP | 2017-056616 | 3/2017 |
| KR | 10-2009-0101850 | 9/2009 |
| KR | 10-2016-0055195 | 5/2016 |
| WO | 2016/187569 | 11/2016 |

\* cited by examiner

FAST DRYING INKJET INK COMPOSITIONS

CROSS-REFERENCE TO RELATED APPLICATIONS

The present application is a 371 of International Application No. PCT/US2020/023503, which was published in English on Oct. 22, 2020, and claims the benefit of U.S. Provisional Application No. 62/835,157 filed on Apr. 17, 2019, both of which are incorporated herein by reference in their entireties.

FIELD

The present disclosure relates generally to inkjet ink compositions, and in particular to fast drying eco solvent ink jet ink compositions. The present disclosure also relates to substrates having the ink compositions printed thereon.

BACKGROUND

Ink jet recording is a printing method wherein droplets of an ink composition are ejected and deposited onto a recording medium, such as paper, to conduct printing. With this method, an image having high resolution and high quality can be printed at a high speed by means of relatively inexpensive machinery.

Ink jet printing systems are widely used in many different fields to produce printed images on a variety of substrates. Conventional color ink jet printers utilize basic process ink color sets, usually comprising from four to eight process colors, to form the color variations required to print the desired image. One of the well-known process ink color sets comprises four basic colors: cyan, yellow, magenta, and black, and is referred to as the CMYK color set or the CMYK process color method. Generally, the process colors in a process color set are typically used to produce a range of printed colors by combining various amounts of each of the process colors. Typically, in an ink jet printer, the CMYK colors are not actually blended together to form the desired color, rather very small drops of ink of different colors are deposited next to each other on the page. From a slight distance, the human eye tends to blend the individual ink drops together to form an area of the "mixed" color.

In general, conventional ink compositions used in the ink jet recording comprise water as a main component, a colorant component, and a wetting agent, such as glycerin, to prevent clogging and for other purposes. A large number of water-soluble dyes have been used as colorants in these applications in view of high chromas of the colorants, an abundance of types of utilizable colorants, their solubility in water and for other reasons.

The typical dyes, however, often have poor lightfastness, waterfastness and other various properties. Therefore, prints obtained using these dye ink compositions have poor lightfastness and waterfastness. Attempts have been made to improve waterfastness through the use of specialty recording papers having an ink absorptive layer for ink jet recording. For plain papers, however, the improvement in waterfastness is still unsatisfactory.

Pigments, as compared to dyes, have better lightfastness and waterfastness. This has recently led to studies on utilization of pigments as colorants in the ink composition for ink jet recording to improve the lightfastness and waterfastness of printed images. Pigments are generally insoluble in water. And when a pigment is used in a water-based ink composition, the pigment is typically dispersed in a dispersant and then the ink composition is prepared using the dispersed pigment.

An additional problem with inkjet printing is smearing or blurring of the ink compositions due to the drying time required for the ink compositions. This problem is especially relevant for printed inkjet graphics that are then laminated with a clear protective film. Accordingly, enhancing the penetration of the ink composition, shortening the drying time, and forming a large pixel (for example, a dot) using a smaller amount of the ink is desirable. In pigment-based ink compositions, however, drying time is typically unsatisfactory, e.g., greater than 8 hours.

The need still exists for an ink compositions that have improved lightfastness and waterfastness and that also have fast drying times. The present disclosure includes improved ink compositions for inkjet printing that include a pigment, a binder system, a solvent system, and an epoxy resin.

BRIEF SUMMARY

In an embodiment, the present disclosure is directed to an ink composition comprising a) a pigment present in an amount from 0.5 to 5 wt. % of the ink composition; b) a binder system present in an amount from 0.2 to 15 wt. % of the ink composition; c) a solvent system present in an amount from 1 to 99 wt. % of the ink composition; and d) optionally, an acid scavenger present in an amount from 0.05 to 1 wt. % of the ink composition. The acid scavenger may be an epoxy resin. The ink composition may be a yellow ink composition, a magenta ink composition, a cyan ink composition, a black ink composition, a light magenta ink composition, a white ink composition, or a light cyan ink composition. In some aspects, the pigment may be at least one of Pigment Blue 1, Pigment Blue 15, Pigment Blue 15:1, Pigment Blue 15:3, Pigment Blue 15:4, Pigment Blue 15:6, Pigment Blue 16, Pigment Blue 17-1, Pigment Blue 22, Pigment Blue 22, Pigment Blue 27, Pigment Blue 28, Pigment Blue 29, Pigment Blue 36, and Pigment Blue 60. In some aspects, the pigment may be at least one of Pigment Red 3, Pigment Red 5, Pigment Red 8, Pigment Red 9, Pigment Red 9:8, Pigment Red 19, Pigment Red 22, Pigment Red 31, Pigment Red 38, Pigment Red 43, Pigment Red 48:1, Pigment Red 48:2, Pigment Red 48:3, Pigment Red 48:4, Pigment Red 48:5, Pigment Red 49:1, Pigment Red 53:1, Pigment Red 57:1, Pigment Red 57:2, Pigment Red 58:4, Pigment Red 63:1, Pigment Red 81, Pigment Red 81:1, Pigment Red 81:2, Pigment Red 81:3, Pigment Red 81:4, Pigment Red 88, Pigment Red 104, Pigment Red 108, Pigment Red 112, Pigment Red 122, Pigment Red 123, Pigment Red 144, Pigment Red 146, Pigment Red 149, Pigment Red 166, Pigment Red 168, Pigment Red 169, Pigment Red 170, Pigment Red 177, Pigment Red 178, Pigment Red 179, Pigment Red 184, Pigment Red 185, Pigment Red 207, Pigment Red 208, Pigment Red 216, Pigment Red 224, Pigment Red 226, Pigment Red 257, Pigment Violet 3, Pigment Violet 19, Pigment Violet 23, Pigment Violet 29, Pigment Violet 30, Pigment Violet 37, Pigment Violet 50, Pigment Violet 88, Pigment Orange 13, Pigment Orange 16, Pigment Orange 20, or Pigment Orange 36. In some aspects, the pigment may be at least one of Pigment Yellow 55, Pigment Yellow 74, Pigment Yellow 79, Pigment Yellow 93, Pigment Yellow 110, Pigment Yellow 120, Pigment Yellow 128, Pigment Yellow 138C, Pigment Yellow 139, Pigment Yellow 150, Pigment Yellow 151, Pigment Yellow 155, Pigment Yellow 156, Pigment Yellow 175, Pigment Yellow 180, Pigment Yellow 185 and Pigment Yellow 213. In some aspects, the pigment may be at least one of Pigment Black 6, Pigment Black 7, Pigment Black 9, lamp or vegetable black, bone or ivory black, and furnace or channel black. The binder system may comprise at least two binders. The binder system may comprise at least one copolymer. The binder system may comprise a vinyl acetate copolymer and/or a methacrylate copolymer. The solvent system may comprise at least two solvents, at least three solvents, or at least four solvents. The solvent system may comprise a diethylene glycol. The epoxy resin may comprise 3,4-epoxycyclohexylmethyl-3,4-epoxycyclohexane carboxylate.

An ink set comprising at least a yellow ink composition, a magenta ink composition, a cyan ink composition, and a black ink composition, wherein at least one of the ink compositions comprises an ink composition comprising a) a pigment present in an amount from 0.5 to 5 wt. % of the ink composition; b) a binder system present in an amount from 0.2 to 15 wt. % of the ink composition; c) a solvent system present in an amount from 1 to 99 wt. % of the ink composition; and d) optionally, an acid scavenger present in an amount from 0.05 to 1 wt. % of the ink composition. The acid scavenger may be an epoxy resin. The ink composition may be a yellow ink composition, a magenta ink composition, a cyan ink composition, a black ink composition, a light magenta ink composition, a white ink composition, or a light cyan ink composition. In some aspects, the pigment may be at least one of Pigment Blue 1, Pigment Blue 15, Pigment Blue 15:1, Pigment Blue 15:3, Pigment Blue 15:4, Pigment Blue 15:6, Pigment Blue 16, Pigment Blue 17-1, Pigment Blue 22, Pigment Blue 22, Pigment Blue 27, Pigment Blue 28, Pigment Blue 29, Pigment Blue 36, and Pigment Blue 60. In some aspects, the pigment may be at least one of Pigment Red 3, Pigment Red 5, Pigment Red 8, Pigment Red 9, Pigment Red 9:8, Pigment Red 19, Pigment Red 22, Pigment Red 31, Pigment Red 38, Pigment Red 43, Pigment Red 48:1, Pigment Red 48:2, Pigment Red 48:3, Pigment Red 48:4, Pigment Red 48:5, Pigment Red 49:1, Pigment Red 53:1, Pigment Red 57:1, Pigment Red 57:2, Pigment Red 58:4, Pigment Red 63:1, Pigment Red 81, Pigment Red 81:1, Pigment Red 81:2, Pigment Red 81:3, Pigment Red 81:4, Pigment Red 88, Pigment Red 104, Pigment Red 108, Pigment Red 112, Pigment Red 122, Pigment Red 123, Pigment Red 144, Pigment Red 146, Pigment Red 149, Pigment Red 166, Pigment Red 168, Pigment Red 169, Pigment Red 170, Pigment Red 177, Pigment Red 178, Pigment Red 179, Pigment Red 184, Pigment Red 185, Pigment Red 207, Pigment Red 208, Pigment Red 216, Pigment Red 224, Pigment Red 226, Pigment Red 257, Pigment Violet 3, Pigment Violet 19, Pigment Violet 23, Pigment Violet 29, Pigment Violet 30, Pigment Violet 37, Pigment Violet 50, Pigment Violet 88, Pigment Orange 13, Pigment Orange 16, Pigment Orange 20, or Pigment Orange 36. In some aspects, the pigment may be at least one of Pigment Yellow 55, Pigment Yellow 74, Pigment Yellow 79, Pigment Yellow 93, Pigment Yellow 110, Pigment Yellow 120, Pigment Yellow 128, Pigment Yellow 138C, Pigment Yellow 139, Pigment Yellow 150, Pigment Yellow 151, Pigment Yellow 155, Pigment Yellow 156, Pigment Yellow 175, Pigment Yellow 180, Pigment Yellow 185 and Pigment Yellow 213. In some aspects, the pigment may be at least one of Pigment Black 6, Pigment Black 7, Pigment Black 9, lamp or vegetable black, bone or ivory black, and furnace or channel black. The binder system may comprise at least two binders. The binder system may comprise at least one copolymer. The binder system may comprise a vinyl acetate copolymer and/or a methacrylate copolymer. The solvent system may comprise at least two solvents, at least three solvents, or at least four solvents. The solvent system may comprise a diethylene glycol. The epoxy resin may comprise 3,4-epoxycyclohexylmethyl-3,4-epoxycyclohexane carboxylate. In some aspects, at least two or at least three of the ink compositions comprise the ink composition described above. In some aspects, each of the yellow ink composition, the magenta ink composition, the cyan ink composition, and the black ink composition comprise the ink composition described above.

In another embodiment, the present disclosure is directed a method of preparing the ink composition comprising: a) grinding pigments to form ground pigments having submicron particle size, b) combining the ground pigments with at least one dispersing resin to form a dispersed composition; c) reducing the size of the dispersed composition to be submicron; and d) combining the dispersed composition with a solvent system and a binder system. The ink composition may comprise a) a pigment present in an amount from 0.5 to 5 wt. % of the ink composition; b) a binder system present in an amount from 0.2 to 15 wt. % of the ink composition; c) a solvent system present in an amount from 1 to 99 wt. % of the ink composition; and d) optionally, an acid scavenger present in an amount from 0.05 to 1 wt. % of the ink composition. The acid scavenger may be an epoxy resin. The ink composition may be a yellow ink composition, a magenta ink composition, a cyan ink composition, a black ink composition, a light magenta ink composition, a white ink composition, or a light cyan ink composition. In some aspects, the pigment may be at least one of Pigment Blue 1, Pigment Blue 15, Pigment Blue 15:1, Pigment Blue 15:3, Pigment Blue 15:4, Pigment Blue 15:6, Pigment Blue 16, Pigment Blue 17-1, Pigment Blue 22, Pigment Blue 22, Pigment Blue 27, Pigment Blue 28, Pigment Blue 29, Pigment Blue 36, and Pigment Blue 60. In some aspects, the pigment may be at least one of Pigment Red 3, Pigment Red 5, Pigment Red 8, Pigment Red 9, Pigment Red 9:8, Pigment Red 19, Pigment Red 22, Pigment Red 31, Pigment Red 38, Pigment Red 43, Pigment Red 48:1, Pigment Red 48:2, Pigment Red 48:3, Pigment Red 48:4, Pigment Red 48:5, Pigment Red 49:1, Pigment Red 53:1, Pigment Red 57:1, Pigment Red 57:2, Pigment Red 58:4, Pigment Red 63:1, Pigment Red 81, Pigment Red 81:1, Pigment Red 81:2, Pigment Red 81:3, Pigment Red 81:4, Pigment Red 88, Pigment Red 104, Pigment Red 108, Pigment Red 112, Pigment Red 122, Pigment Red 123, Pigment Red 144, Pigment Red 146, Pigment Red 149, Pigment Red 166, Pigment Red 168, Pigment Red 169, Pigment Red 170, Pigment Red 177, Pigment Red 178, Pigment Red 179, Pigment Red 184, Pigment Red 185, Pigment Red 207, Pigment Red 208, Pigment Red 216, Pigment Red 224, Pigment Red 226, Pigment Red 257, Pigment Violet 3, Pigment Violet 19, Pigment Violet 23, Pigment Violet 29, Pigment Violet 30, Pigment Violet 37, Pigment Violet 50, Pigment Violet 88, Pigment Orange 13, Pigment Orange 16, Pigment Orange 20, or Pigment Orange 36. In some aspects, the pigment may be at least one of Pigment Yellow 55, Pigment Yellow 74, Pigment Yellow 79, Pigment Yellow 93, Pigment Yellow 110, Pigment Yellow 120, Pigment Yellow 128, Pigment Yellow 138C, Pigment Yellow 139, Pigment Yellow 150, Pigment Yellow 151, Pigment Yellow 155, Pigment Yellow 156, Pigment Yellow 175, Pigment Yellow 180, Pigment Yellow 185 and Pigment Yellow 213. In some aspects, the pigment may be at least one of Pigment Black 6, Pigment Black 7, Pigment Black 9, lamp or vegetable black, bone or ivory black, and furnace or channel black. The binder system may comprise at least two binders. The binder system may comprise at least one copolymer. The binder system may comprise a vinyl acetate copolymer and/or a methacrylate copolymer. The solvent system may comprise at least two solvents, at least three solvents, or at least four solvents. The solvent system may comprise a diethylene glycol. The epoxy resin may comprise 3,4-epoxycyclohexylmethyl-3,4-epoxycyclohexane carboxylate.

In another embodiment, the present disclosure is directed a method of printing inkjet ink composition from an inkjet printer, comprising: a) providing at least one inkjet ink composition to an inkjet printer; and b) printing the ink composition onto a substrate; wherein the ink composition dries on the printed substrate within less than 8 hours. The ink composition may comprise a) a pigment present in an amount from 0.5 to 5 wt. % of the ink composition; b) a binder system present in an amount from 0.2 to 15 wt. % of the ink composition; c) a solvent system present in an amount from 1 to 99 wt. % of the ink composition; and d) optionally, an acid scavenger present in an amount from 0.05 to 1 wt. % of the ink composition. The acid scavenger may be an epoxy resin. The ink composition may be a yellow ink composition, a magenta ink composition, a cyan ink composition, a black ink composition, a light magenta ink composition, a white ink composition, or a light cyan ink composition. In some aspects, the pigment may be at least one of Pigment Blue 1, Pigment Blue 15, Pigment Blue 15:1, Pigment Blue 15:3, Pigment Blue 15:4, Pigment Blue 15:6, Pigment Blue 16, Pigment Blue 17-1, Pigment Blue 22, Pigment Blue 22, Pigment Blue 27, Pigment Blue 28, Pigment Blue 29, Pigment Blue 36, and Pigment Blue 60. In some aspects, the pigment may be at least one of Pigment Red 3, Pigment Red 5, Pigment Red 8, Pigment Red 9, Pigment Red 9:8, Pigment Red 19, Pigment Red 22, Pigment Red 31, Pigment Red 38, Pigment Red 43, Pigment Red 48:1, Pigment Red 48:2, Pigment Red 48:3, Pigment Red 48:4, Pigment Red 48:5, Pigment Red 49:1, Pigment Red 53:1, Pigment Red 57:1, Pigment Red 57:2, Pigment Red 58:4, Pigment Red 63:1, Pigment Red 81, Pigment Red 81:1, Pigment Red 81:2, Pigment Red 81:3, Pigment Red 81:4, Pigment Red 88, Pigment Red 104, Pigment Red 108, Pigment Red 112, Pigment Red 122, Pigment Red 123, Pigment Red 144, Pigment Red 146, Pigment Red 149, Pigment Red 166, Pigment Red 168, Pigment Red 169, Pigment Red 170, Pigment Red 177, Pigment Red 178, Pigment Red 179, Pigment Red 184, Pigment Red 185, Pigment Red 207, Pigment Red 208, Pigment Red 216, Pigment Red 224, Pigment Red 226, Pigment Red 257, Pigment Violet 3, Pigment Violet 19, Pigment Violet 23, Pigment Violet 29, Pigment Violet 30, Pigment Violet 37, Pigment Violet 50, Pigment Violet 88, Pigment Orange 13, Pigment Orange 16, Pigment Orange 20, or Pigment Orange 36. In some aspects, the pigment may be at least one of Pigment Yellow 55, Pigment Yellow 74, Pigment Yellow 79, Pigment Yellow 93, Pigment Yellow 110, Pigment Yellow 120, Pigment Yellow 128, Pigment Yellow 138C, Pigment Yellow 139, Pigment Yellow 150, Pigment Yellow 151, Pigment Yellow 155, Pigment Yellow 156, Pigment Yellow 175, Pigment Yellow 180, Pigment Yellow 185 and Pigment Yellow 213. In some aspects, the pigment may be at least one of Pigment Black 6, Pigment Black 7, Pigment Black 9, lamp or vegetable black, bone or ivory black, and furnace or channel black. The binder system may comprise at least two binders. The binder system may comprise at least one copolymer. The binder system may comprise a vinyl acetate copolymer and/or a methacrylate copolymer. The solvent system may comprise at least two solvents, at least three solvents, or at least four solvents. The solvent system may comprise a diethylene glycol. The epoxy resin may comprise 3,4-epoxycyclohexylmethyl-3,4-epoxycyclohexane carboxylate.

DETAILED DESCRIPTION

The presently disclosed compositions, sets, methods, and other features now will be described more fully hereinafter with reference to the accompanying drawings, in which some, but not all embodiments are shown. Indeed, these compositions, sets, methods, and other features can be embodied in many different forms and should not be construed as limited to the embodiments set forth herein; rather, these embodiments are provided so that this disclosure will satisfy applicable legal requirements. As used in the specification, and in the appended claims, the singular forms "a," "an," "the," include plural referents unless the context clearly dictates otherwise.

In some embodiments, the present disclosure includes inkjet ink compositions comprising a pigment, a binder system, a solvent system, and an epoxy resin. The inkjet ink composition may for example be used in inkjet printers and, when printed with such a printer, provides for fast lamination of printed images, e.g., within 8 hours or less. The inkjet ink composition may be a process color ink composition such as cyan, magenta, yellow, or black. In some aspects, the inkjet ink composition may be a light cyan or light magenta color ink composition.

Surprisingly and unexpectedly, it has been discovered that the aforementioned ink compositions that contain the particular pigment, binder system, solvent system, and epoxy resin (optionally in specific amounts) have been found to improve drying times as compared to other ink compositions, including other pigment-based ink compositions. While conventional inks may look and feel "dry to the touch," the residual solvent content of the film on which the image appears is not dry enough to have satisfactory performance when a clear film is laminated over the image. For example, when residual solvents remain trapped in the composite film-image-overlaminate, bubbles may development between the imaged film and the laminate. Additionally, there may be reduced and/or altered adhesion or durability of the adhesive function of the final product. Further functional problems may occur.

Without being bound by theory, it is postulated that because the inventive ink compositions do not contain slow drying solvents, and because of the synergistic relationship between the chosen solvents, binders, and additives, the printed output may be reliably laminated and installed within 8 hours of creation of the image. Additionally, without being bound by theory, it is postulated that nozzle open time, machine reliability, machine maintenance requirements, and weathering of the final product are comparable or superior to current commercial products because of this synergistic relationship between the components.

Ink Compositions

As explained herein, the present disclosure is directed to ink compositions, e.g., inkjet ink compositions. The ink compositions generally comprise a pigment, a binder system, a solvent system, and an epoxy resin. In some aspects, the ink composition may comprise from 0.5 to 5 wt. % pigment, from 0.2 to 15 wt. % binder system, from 1 to 99 wt. % solvent system, and from 0.05 to 1 wt. % epoxy resin. Each component and further concentration ranges and limits for the component are described further herein.

Pigment

As described herein, the ink composition comprises a pigment. The pigment may be provided in dispersed form, although the pigment may also be provided in non-dispersed form.

The pigment may be selected depending on the desired color of the final ink composition. In some aspects, especially when the ink composition is supplied or used as part of an ink set, the pigment may be chosen to complement other pigments used in separate ink compositions in the ink set. The combination of the pigment, when employed with the binder system, solvent system, and epoxy resin, as described herein, provides for particular unexpected benefits, e.g., fast dry times. In preferred embodiments, the specific concentration of the pigment in the ink composition provides for further unexpected benefits.

In some aspects, the ink composition is a cyan ink composition. Exemplary pigments include Pigment Blue 1, Pigment Blue 15, Pigment Blue 15:1, Pigment Blue 15:3, Pigment Blue 15:4, Pigment Blue 15:6, Pigment Blue 16, Pigment Blue 17-1, Pigment Blue 22, Pigment Blue 22, Pigment Blue 27, Pigment Blue 28, Pigment Blue 29, Pigment Blue 36, Pigment Blue 60. "Pigment Blue" may also be referred to as phthalocyanine blue. In a preferred embodiment, the pigment comprises Phthalocyanine Blue 15:4 or 15:3 pigment.

In terms of lower limits, the cyan ink composition may comprise at least 0.5 wt. % pigment, e.g., at least 0.75 wt. %, at least 1 wt. %, at least 1.25 wt. %, at least 1.5 wt. %, at least 1.75 wt. %, at least 2 wt. %, at least 2.25 wt. %, at least 2.5 wt. %, at least 2.75 wt. %, or at least 3 wt. %. In terms of upper limits, the cyan ink composition may comprise less than 5 wt. % pigment, e.g., less than 4.75 wt. %, less than 4.5 wt. %, less than 4.25 wt. %, less than 4 wt. %, less than 3.75 wt. %, less than 3.5 wt. %, or less than 3.25 wt. %. In terms of ranges, the cyan ink composition may comprise from 0.5 to 5 wt. % pigment, e.g., from 0.75 to 4.75 wt. %, from 1 to 4.5 wt. %, from 1.25 to 4.25 wt. %, from 1.5 to 4 wt. %, from 1.75 to 3.75 wt. %, from 2 to 3.5 wt. %, from 2.25 to 3.5 wt. %, from 2.5 to 3.5 wt. %, from 2.75 to 3.5 wt. %, or from 3 to 3.25 wt. %. All sub-values and ranges lying within the values recited above are also contemplated. The recited weight percentages are based on the total weight percentage of the ink composition.

In some aspects, the ink composition is a magenta ink composition. Exemplary pigments include Pigment Red 3, Pigment Red 5, Pigment Red 8, Pigment Red 9, Pigment Red 9:8, Pigment Red 19, Pigment Red 22, Pigment Red 31, Pigment Red 38, Pigment Red 43, Pigment Red 48:1, Pigment Red 48:2, Pigment Red 48:3, Pigment Red 48:4, Pigment Red 48:5, Pigment Red 49:1, Pigment Red 53:1, Pigment Red 57:1, Pigment Red 57:2, Pigment Red 58:4, Pigment Red 63:1, Pigment Red 81, Pigment Red 81:1, Pigment Red 81:2, Pigment Red 81:3, Pigment Red 81:4, Pigment Red 88, Pigment Red 104, Pigment Red 108, Pigment Red 112, Pigment Red 122, Pigment Red 123, Pigment Red 144, Pigment Red 146, Pigment Red 149, Pigment Red 166, Pigment Red 168, Pigment Red 169, Pigment Red 170, Pigment Red 177, Pigment Red 178, Pigment Red 179, Pigment Red 184, Pigment Red 185, Pigment Red 207, Pigment Red 208, Pigment Red 216, Pigment Red 224, Pigment Red 226, Pigment Red 257, Pigment Violet 3, Pigment Violet 19, Pigment Violet 23, Pigment Violet 29, Pigment Violet 30, Pigment Violet 37, Pigment Violet 50, Pigment Violet 88, or Pigment Orange 13, Pigment Orange 16, Pigment Orange 20, or Pigment Orange 36. In a preferred embodiment, the pigment comprises Pigment Red 122 or Pigment Red 224.

In terms of lower limits, the magenta ink composition may comprise at least 0.5 wt. % pigment, e.g., at least 0.75 wt. %, at least 1 wt. %, at least 1.25 wt. %, at least 1.5 wt. %, at least 1.75 wt. %, at least 2 wt. %, at least 2.25 wt. %, at least 2.5 wt. %, at least 2.75 wt. %, or at least 3 wt. %. In terms of upper limits, the magenta ink composition may comprise less than 5 wt. % pigment, e.g., less than 4.75 wt. %, less than 4.5 wt. %, less than 4.25 wt. %, less than 4 wt. %, less than 3.75 wt. %, less than 3.5 wt. %, or less than 3.25 wt. %. In terms of ranges, the magenta ink composition may comprise from 0.5 to 5 wt. % pigment, e.g., from 0.75 to 4.75 wt. %, from 1 to 4.5 wt. %, from 1.25 to 4.25 wt. %, from 1.5 to 4 wt. %, from 1.75 to 3.75 wt. %, from 2 to 3.5 wt. %, from 2.25 to 3.5 wt. %, from 2.5 to 3.5 wt. %, from 2.75 to 3.5 wt. %, or from 3 to 3.25 wt. %. All sub-values and ranges lying within the values recited above are also contemplated. The recited weight percentages are based on the total weight percentage of the ink composition.

In some aspects, the ink composition is a yellow ink composition. Exemplary pigments include Pigment Yellow 55, Pigment Yellow 74, Pigment Yellow 79, Pigment Yellow 93, Pigment Yellow 110, Pigment Yellow 120, Pigment Yellow 128, Pigment Yellow 138C, Pigment Yellow 139, Pigment Yellow 150, Pigment Yellow 151, Pigment Yellow 155, Pigment Yellow 156, Pigment Yellow 175, Pigment Yellow 180, Pigment Yellow 185 and Pigment Yellow 213. In a preferred embodiment, the pigment comprises Pigment Yellow 151.

In terms of lower limits, the yellow ink composition may comprise at least 0.5 wt. % pigment, e.g., at least 0.75 wt. %, at least 1 wt. %, at least 1.25 wt. %, at least 1.5 wt. %, at least 1.75 wt. %, at least 2 wt. %, at least 2.25 wt. %, at least 2.5 wt. %, at least 2.75 wt. %, or at least 3 wt. %. In terms of upper limits, the yellow ink composition may comprise less than 5 wt. % pigment, e.g., less than 4.75 wt. %, less than 4.5 wt. %, less than 4.25 wt. %, less than 4 wt. %, less than 3.75 wt. %, less than 3.5 wt. %, or less than 3.25 wt. %. In terms of ranges, the yellow ink composition may comprise from 0.5 to 5 wt. % pigment, e.g., from 0.75 to 4.75 wt. %, from 1 to 4.5 wt. %, from 1.25 to 4.25 wt. %, from 1.5 to 4 wt. %, from 1.75 to 3.75 wt. %, from 2 to 3.5 wt. %, from 2.25 to 3.5 wt. %, from 2.5 to 3.5 wt. %, from 2.75 to 3.5 wt. %, or from 3 to 3.25 wt. %. All sub-values and ranges lying within the values recited above are also contemplated. The recited weight percentages are based on the total weight percentage of the ink composition.

In some aspects, the ink composition is a black ink composition. Exemplary pigments include Pigment Black 6, Pigment Black 7, Pigment Black 9, lamp or vegetable black, bone or ivory black, and furnace or channel black. In some aspects, only one pigment is included in the black ink composition. In a preferred embodiment, the pigment comprises Pigment Black 7.

In terms of lower limits, the black ink composition may comprise at least 0.5 wt. % pigment, e.g., at least 0.6 wt. %, at least 7 wt. %, at least 0.8 wt. %, at least 0.9 wt. %, or at least 1 wt. %. In terms of upper limits, the black ink composition may comprise less than 5 wt. % pigment, e.g., less than 4.75 wt. %, less than 4.5 wt. %, less than 4.25 wt. %, less than 4 wt. %, less than 3.75 wt. %, less than 3.5 wt. %, or less than 3.25 wt. %. In terms of ranges, the black ink composition may comprise from 0.5 to 5 wt. % pigment, e.g., from 0.5 to 4.75 wt. %, from 0.5 to 4.5 wt. %, from 0.5 to 4.25 wt. %, from 0.5 to 4 wt. %, from 0.5 to 3.75 wt. %, from 0.6 to 3.5 wt. %, from 0.7 to 3.5 wt. %, from 0.8 to 3.5 wt. %, from 0.9 to 3.5 wt. %, or from 1 to 3.25 wt. %. All sub-values and ranges lying within the values recited above are also contemplated. The recited weight percentages are based on the total weight percentage of the ink composition.

In some aspects, the ink composition is a light cyan ink composition. Exemplary pigments include. In terms of lower limits, the light cyan ink composition may comprise at least 0.5 wt. % pigment, e.g., at least 0.75 wt. %, at least 1 wt. %, at least 1.25 wt. %, at least 1.5 wt. %, at least 1.75 wt. %, at least 2 wt. %, at least 2.25 wt. %, at least 2.5 wt. %, at least 2.75 wt. %, or at least 3 wt. %. In terms of upper limits, the light cyan ink composition may comprise less than 5 wt. % pigment, e.g., less than 4.75 wt. %, less than 4.5 wt. %, less than 4.25 wt. %, less than 4 wt. %, less than 3.75 wt. %, less than 3.5 wt. %, or less than 3.25 wt. %. In terms of ranges, the light cyan ink composition may comprise from 0.5 to 5 wt. % pigment, e.g., from 0.75 to 4.75 wt. %, from 1 to 4.5 wt. %, from 1.25 to 4.25 wt. %, from 1.5 to 4 wt. %, from 1.75 to 3.75 wt. %, from 2 to 3.5 wt. %, from 2.25 to 3.5 wt. %, from 2.5 to 3.5 wt. %, from 2.75 to 3.5 wt. %, or from 3 to 3.25 wt. %. All sub-values and ranges lying within the values recited above are also contemplated. The recited weight percentages are based on the total weight percentage of the ink composition.

In some aspects, the ink composition is a light magenta ink composition. Exemplary pigments include. In terms of lower limits, the light magenta ink composition may comprise at least 0.5 wt. % pigment, e.g., at least 0.75 wt. %, at least 1 wt. %, at least 1.25 wt. %, at least 1.5 wt. %, at least 1.75 wt. %, at least 2 wt. %, at least 2.25 wt. %, at least 2.5 wt. %, at least 2.75 wt. %, or at least 3 wt. %. In terms of upper limits, the light magenta ink composition may comprise less than 5 wt. % pigment, e.g., less than 4.75 wt. %, less than 4.5 wt. %, less than 4.25 wt. %, less than 4 wt. %, less than 3.75 wt. %, less than 3.5 wt. %, or less than 3.25 wt. %. In terms of ranges, the light magenta ink composition may comprise from 0.5 to 5 wt. % pigment, e.g., from 0.75 to 4.75 wt. %, from 1 to 4.5 wt. %, from 1.25 to 4.25 wt. %, from 1.5 to 4 wt. %, from 1.75 to 3.75 wt. %, from 2 to 3.5 wt. %, from 2.25 to 3.5 wt. %, from 2.5 to 3.5 wt. %, from 2.75 to 3.5 wt. %, or from 3 to 3.25 wt. %. All sub-values and ranges lying within the values recited above are also contemplated. The recited weight percentages are based on the total weight percentage of the ink composition.

Additional colored ink compositions, such as dark gray, light gray, green, orange, red, white, and blue may be formulated to be included with an ink set, described below. In some aspects, such compositions may have similar make-ups as the compositions above, except with different pigments. In other aspects, the compositions may be different than those described above. In certain aspects, no white ink composition is included in the contemplated ink sets.

Binder System

Each of the above described ink compositions may further comprise a binder system. In terms of lower limits, the ink composition may comprise at least 0.2 wt. % binder system, e.g., at least 0.4 wt. %, at least 0.5 wt. %, at least 0.75 wt. %, at least 1 wt. %, at least 3 wt. %, or at least 5 wt. %. In terms of upper limits, the ink composition may comprise less than 15 wt. % binder system, e.g., less than 14 wt. %, less than 13 wt. %, less than 12 wt. %, less than 11 wt. %, or less than 10 wt. %. In terms of ranges, the ink composition may comprise from 0.2 to 15 wt. % binder system, e.g., from 0.4 to 14 wt. %, from 0.5 to 13 wt. %, from 0.75 to 12 wt. %, from 1 to 11 wt. %, from 3 to 10 wt. %, or from 5 to 10 wt. %. The binder system may comprise at least copolymer and ins some aspects, may comprise at least two copolymers. Exemplary copolymers include vinyl chloride copolymers, (meth)acrylate copolymers, vinyl acetate, nitrocellulose, cellulose acetate butyrate, polyurethane, and others. In some aspects, the binder system comprises a vinyl chloride copolymer and a methacrylate copolymer. In terms of lower limits, the vinyl chloride copolymer may comprise at least 50 wt. % vinyl chloride, e.g., at least 55 wt. %, at least 60 wt. %, at least 65 wt. %, at least 70 wt. %, at least 75 wt. %, at least 80 wt. %, or at least 85 wt. %. In terms of upper limits, the vinyl chloride copolymer may comprise less than 99.9 wt. % vinyl chloride, e.g., less than 99.5 wt. %, less than 99 wt. %, less than 98 wt. %, less than 97 wt. %, less than 96 wt. %, less than 95 wt. %, or less than 92.5. In terms of ranges, the vinyl chloride copolymer may comprise from 50 to 99.9 wt. % vinyl chloride, e.g., from 55 to 99.5 wt. %, from 60 to 99 wt. %, from 65 to 98 wt. %, from 70 to 97 wt. %, from 75 to 96 wt. %, from 80 to 95 wt. %, or from 85 to 92.5 wt. %. and from 1 to 50 wt. % vinyl acetate. The vinyl chloride copolymer may also comprise vinyl acetate. In terms of lower limits, the vinyl chloride copolymer may comprise at least 0.1 wt. % vinyl acetate, e.g., at least 0.5 wt. %, at least 1 wt. %, at least 2 wt. %, at least 3 wt. %, at least 4 wt. %, at least 5 wt. %, or at least 7.5 wt. %. In terms of upper limits, the vinyl chloride copolymer may comprise less than 50 wt. % vinyl acetate, e.g., less than 45 wt. %, less than 40 wt. %, less than 35 wt. %, less than 30 wt. %, less than 25 wt. %, less than 20 wt. %, or less than 15 wt. %. In terms of ranges, the vinyl chloride copolymer may comprise from 0.1 to 50 wt. % vinyl acetate, e.g., from 0.5 to 45 wt. %, from 1 to 40 wt. %, from 2 to 35 wt. %, from 3 to 30 wt. %, from 4 to 25 wt. %, from 5 to 20 wt. %, or from 7.5 to 15 wt. %. All sub-values and ranges lying within the values recited above are also contemplated.

In aspects where a vinyl chloride copolymer and a methacrylate copolymer are included, the ratio of vinyl chloride copolymer to methacrylate copolymer may range from 100:1 to 1:100, e.g., from 75:1 to 1:75, from 50:1 to 1:50, from 25:1 to 1:25, from 10:1 to 1:10, from 5:1 to 1:5, from 3:1 to 1:3, from 2:1 to 1:2, or approximately 1:1. In terms of the lower limits, the ink composition may comprise at least 0.1 wt. % vinyl chloride copolymer, e.g., at least 0.2 wt. %, at least 0.3 wt. %, at least 0.4 wt. %, at least 0.5 wt. %, at least 0.75 wt. %, or at least 1 wt. %. In terms of upper limits, the ink composition may comprise less than 5 wt. % vinyl chloride copolymer, e.g., less than 4.75 wt. %, less than 4.5 wt. %, less than 4.25 wt. %, less than 4 wt. %, less than 3.75 wt. %, or less than 3.5 wt. %. In terms of ranges, the ink composition may comprise from 0.1 to 5 wt. % vinyl chloride copolymer, e.g., from 0.2 to 4.75 wt. %, from 0.3 to 4.5 wt. %, from 0.4 to 4.25 wt. %, from 0.5 to 4 wt. %, from 0.75 to 3.75 wt. %, or from 1 to 3.5 wt. %. In terms of lower limits, the ink composition may comprise at least 0.1 wt. % methacrylate copolymer, e.g., at least 0.2 wt. %, at least 0.3 wt. %, at least 0.4 wt. %, at least 0.5 wt. %, at least 0.75 wt. %, or at least 1 wt. %. In terms of upper limits, the ink composition may comprise less than 10 wt. % methacrylate copolymer, e.g., less than 9.75 wt. %, less than 9.5 wt. %, less than 9.25 wt. %, less than 9 wt. %, less than 8.75 wt. %, or less than 8.5 wt. %. In terms of ranges, the ink composition may comprise from 0.1 to 10 wt. % methacrylate copolymer, e.g., from 0.2 to 9.75 wt. %, from 0.3 to 9.5 wt. %, from 0.4 to 9.25 wt. %, from 0.5 to 9 wt. %, from 0.75 to 8.75 wt. %, or from 1 to 8.5 wt. %. All sub-values and ranges lying within the values recited above are also contemplated. The recited weight percentages are based on the total weight percentage of the ink composition.

Suitable commercial binder products include VINNOL® sold by Wacker as well as Solbin's C-Type, A-Type, M-Type. In some aspects, Wacker H14/36 is a VCl/VAc (vinyl chloride/vinyl acetate) class of copolymer that may be used. In further aspects, Solbin CL is a VCl/VAc class of copolymer that may be used. Acrylic polymers may also be used.

It is believed that the binder, optionally in at the specific concentrations, interacts with the pigment to allow for product transparency and useful shelf life. In some aspects, the ratio of binder to pigment is at least 1:1, e.g., at least 1.5:1, at least 1.75:1, at least 2:1, at least 2.25:1, at least 2.5:1, at least 2.75:1, or at least 3:1. In terms of ranges, the ratio of binder to pigment may be from 1:1 to 3:1, e.g., from 1:1 to 2.75:1, from 1:1 to 2.5:1, from 1:1 to 2.25:1, from 1:1 to 2.25:1, from 1:1 to 2:1, and all ranges in between.

Solvent System

Each of the above described ink compositions may further comprise a solvent system. In terms of lower limits, the ink composition may comprise at least 1 wt. % solvent system, e.g., at least 3 wt. %, at least 5 wt. %, at least 10 wt. %, at least 15 wt. %, at least 20 wt. %, at least 25 wt. %, at least 30 wt. %, at least 40 wt. %, or at least 50 wt. %. In terms of upper limits, the ink composition may comprise less than 99 wt. % solvent system, e.g., less than 97.5 wt. %, less than 95 wt. %, less than 90 wt. %, less than 85 wt. %, less than 80 wt. %, less than 75 wt. %, less than 70 wt. %, less than 65 wt. %, or less than 60 wt. %. In terms of ranges, the ink composition may comprise from 1 to 99 wt. % solvent system, e.g., from 3 to 97.5 wt. %, from 5 to 95 wt. %, from 10 to 90 wt. %, from 15 to 85 wt. %, from 20 to 80 wt. %, from 25 to 75 wt. %, from 30 to 70 wt. %, from 40 to 65 wt. %, or from 50 to 60 wt. %. All sub-values and ranges lying within the values recited above are also contemplated. The recited weight percentages are based on the total weight percentage of the ink composition.

In some aspects, the solvent system comprises at least one solvent, e.g., at least two solvents, at least three solvents, or at least four solvents. One solvent may be present in a predominant amount of the solvent system, while the remaining solvents are present in lesser amounts. For example, a first solvent may be present in an amount of at least 50 wt. %, based on the total weight of the solvent system, e.g., at least 55 wt. %, at least 57.5 wt. %, or at least 60 wt. %. In terms of upper limits, the first solvent may be present in an amount of less than 80 wt. %, based on the total weight of the solvent system, e.g., less than 77.5 wt. %, less than 75 wt. %, less than 72.5 wt. %, or less than 70 wt. %. In terms of ranges, the solvent system may comprise from 50 to 80 wt. % first solvent, e.g., from 55 to 77.5 wt. %, from 57.5 to 75 wt. %, or from 60 to 72.5 wt. %. The first solvent may be a diethylene glycol, such as diethylene glycol ethyl methyl ether. Additional solvents that may be used as the first solvent (or any solvent described herein) include glymes, in particular diethylene glycol ethyl methyl ether, ethyl diglyme, and tetraglyme; γ-butyrolactone; glycol ether acetates such as ethylene glycol butyl ether acetate, dipropylene glycol methyl ether; and propylene carbonate. Such solvents are manufactured by Clarient and Novolyte. Other solvents include γ-butyrolactone (GBL), Glycol ether acetates such as glycol ether EBA (Ethylene glycol butyl ether acetate), Arcosolv® DPM (Dipropylene glycol methyl ether), propylene carbonate, and γ-Valerolactone (GVL), ε-caprolactone (PCL), N-ethyl-2-pyrrolidone (NEP), 3,3,5-trimethylcyclohexanone, and 3-methyl-2-oxazolidinone, All sub-values and ranges lying within the values recited above are also contemplated.

When present, the second solvent may be present in an amount of at least 0.1 wt. %, based on the total weight of the solvent system, e.g., at least 0.5 wt. %, at least 0.75 wt. %, or at least 1 wt. %. In terms of upper limits, the second solvent may be present in an amount of less than 10 wt. %, based on the total weight of the solvent system, e.g., less than 9.75 wt. %, less than 9.5 wt. %, less than 9.25 wt. %, or less than 9 wt. %. In terms of ranges, the solvent system may comprise from 0.1 to 10 wt. % second solvent, e.g., from 0.5 to 9.75 wt. %, from 0.75 to 9.5 wt. %, from 1 to 9.25 wt. %, or from 1 to 9.5 wt. %. The second solvent may be a lactone, such as γ-butyrolactone. As described above, other solvents may be used in place of the lactone. All sub-values and ranges lying within the values recited above are also contemplated.

When present, the third solvent may be present in an amount of at least 0.1 wt. %, based on the total weight of the solvent system, e.g., at least 0.5 wt. %, at least 0.75 wt. %, at least 1 wt. %, or at least 5 wt. %. In terms of upper limits, the third solvent may be present in an amount of less than 20 wt. %, based on the total weight of the solvent system, e.g., less than 17.5 wt. %, less than 15 wt. %, less than 12.5 wt. %, or less than 10 wt. %. In terms of ranges, the solvent system may comprise from 0.1 to 20 wt. % third solvent, e.g., from 0.5 to 17.5 wt. %, from 0.75 to 15 wt. %, from 1 to 12.5 wt. %, or from 1 to 10 wt. %. The third solvent may be a dipropylene glycol, such as dipropylene glycol methyl ethyl ether. As described above, other solvents may be used in place of the dipropylene glycol. All sub-values and ranges lying within the values recited above are also contemplated.

When present, the fourth solvent may be present in an amount of at least 0.1 wt. %, based on the total weight of the solvent system, e.g., at least 0.15 wt. %, at least 0.2 wt. %, or at least 0.25 wt. %. In terms of upper limits, the third solvent may be present in an amount of less than 1 wt. %, based on the total weight of the solvent system, e.g., less than 0.75 wt. %, less than 0.6 wt. %, less than 0.5 wt. %, or less than 0.4 wt. %. In terms of ranges, the solvent system may comprise from 0.1 to 1 wt. % fourth solvent, e.g., from 0.15 to 0.75 wt. %, from 0.2 to 0.6 wt. %, from 0.25 to 0.5 wt. %, or from 0.25 to 0.4 wt. %. The fourth solvent may be a pyrrolidone such as n-methyl pyrrolidone. All sub-values and ranges lying within the values recited above are also contemplated.

Acid Scavenger

Each of the above described ink compositions may further comprise an acid scavenger that is compatible with the solvents used in the ink composition. In some aspects, the acid scavenger is an epoxy resin. In terms of lower limits, the ink composition may comprise at least 0.05 wt. % acid scavenger, e.g., at least 0.075 wt. %, at least 0.1 wt. %, at least 0.15 wt. %, at least 0.2 wt. %, at least 0.25 wt. %, at least 0.3 wt. %, at least 0.35 wt. %, at least 0.4 wt. %, or at least 0.5 wt. %. In terms of upper limits, the ink composition may comprise less than 1 wt. % acid scavenger, e.g., less than 0.95 wt. %, less than 0.9 wt. %, less than 0.85 wt. %, less than 0.8 wt. %, less than 0.75 wt. %, less than 0.7 wt. %, less than 0.65 wt. %, less than 0.6 wt. %, or less than 0.55 wt. %. In terms of ranges, the ink composition may comprise from 0.01 to 1 wt. % acid scavenger, e.g., from 0.05 to 0.95 wt. %, from 0.075 to 0.9 wt. %, from 0.1 to 0.85 wt. %, from 0.15 to 0.8 wt. %, from 0.2 to 0.75 wt. %, from 0.25 to 0.7 wt. %, from 0.3 to 0.65 wt. %, from 0.4 to 0.6 wt. %, or from 0.5 to 0.55 wt. %. All sub-values and ranges lying within the values recited above are also contemplated. The recited weight percentages are based on the total weight percentage of the ink composition.

The epoxy resin may vary widely, and many epoxy resins are known. An exemplary epoxy resin is 3,4 epoxycyclohexylmethyl 3,4 epoxycyclohexane carboxylate. Other cycloaliphatic epoxides may also be used as long as they have solubility in the solvents mixture described herein, e.g., a mixture of glymes and glycol ethers.

Suitable commercial epoxy resin products include Celloxide 2021P sold by Daicel, Omnilane OC1005 sold by IGM, and TTA21 sold by Phibro Chem, Ink Sets In some aspects, the ink composition is provided as part of an ink set. Non-limiting examples of ink sets include 3-ink, 4-ink, or 6-ink sets. In some aspects, an 8-ink or 12-ink set may be contemplated.

In some aspects, the 3-ink set includes a black ink composition, a cyan ink composition, and a magenta ink composition. In further aspects, the 3-ink set includes a black ink composition, a cyan ink composition, and a yellow ink composition. In still further aspects, the 3-ink set includes a black ink composition, a magenta ink composition, and a yellow ink composition. In yet further aspects, the 3-ink set includes a cyan ink composition, a magenta ink composition, and a yellow ink composition.

In some aspects, the 4-ink set includes a black ink composition, a cyan ink composition, a magenta ink composition, and a yellow ink composition.

In some aspects, the 8-ink set includes a black ink composition, a cyan ink composition, a magenta ink composition, a yellow ink composition, and four additional ink compositions selected from a red ink composition, a blue ink composition, a green ink composition, a light magenta ink composition, a light cyan ink composition, an orange ink composition, a light gray ink composition, and a dark gray ink composition.

In some aspects, the 12-ink set includes a black ink composition, a cyan ink composition, a magenta ink composition, a yellow ink composition, a red ink composition, a blue ink composition, a green ink composition, a light magenta ink composition, a light cyan ink composition, an orange ink composition, a light gray ink composition, and a dark gray ink composition.

In some aspects, the 3-ink and 4-ink sets described above include a light cyan ink composition in place of the cyan ink composition described above. In further aspects, the 3-ink set includes a light magenta ink composition in place of the magenta composition described above.

As described herein, the synergistic combination of components allows for improved drying time compared to conventional inks, e.g., a drying time of 8 hours or less from the time the image is printed. Such a reduced drying time may also allow for additional benefits, such as increase volume of ink used on an image, increased color and brightness, and other desirable image qualities such as dot grain, improved color gamut, and the range of colors that can be produced.

Methods of Preparing Ink Compositions

The ink compositions may be prepared by first grinding the pigments to submicron particle size. The particle size may be less than 1000 nanometers, e.g., less than 750 nanometers or less than 500 nanometers. In some aspects, the maximum size D100 or at least 95% of particles are less than 1000 nanometers, e.g., less than 750 nanometers, or less than 500 nanometers. In some aspects, for black pigments, the particle size may be smaller, such as 95% of particles should be no larger than 100 to 250 nanometers. In some aspects, cyan pigments, 95% of particles may be no larger than 200 to 300 nanometers. In some aspects, for magenta pigments, 95% of particles may be no larger than 300 nanometers. In some aspects, for white pigments, 95% of pigment particles may be no larger than 500 nanometers.

The pigments may then be combined with dispersing resins, e.g., functional dispersants possessing affinity for the particular pigment surface. The pigments may then be then size reduced using any variety of shear inducing equipment including media mill, high shear disperser blade, ultrasound milling or dispersing equipment, to meet the preferred particle sizes with sufficient and appropriate dispersants attached and surrounding the particle surface, with a preferred unimodal particle size distribution. Finally, the dispersed and size reduced pigments may be subsequently combined with the resins, binders, solvents, and other materials of the ink formulation.

Method of Printing Ink Compositions

The ink compositions may be used in an inkjet printer for inkjet printing. The ink composition may be supplied to the inkjet printer. The inkjet printer may print various types of printed indicia, including text and graphics. The inkjet printer may be a commercial wide format inkjet printer, such as those sold by Mutoh, Mimaki and Roland. Such commercial printers may be used to print onto graphic films, such as graphic vinyl films. The ink may be printed onto a substrate. Advantageously, the ink compositions disclosed herein have improved drying time as compared to existing inkjet ink compositions. Such improved drying time allows for lamination of the printed substrate within 8 hours or less. Exemplary substrates include paper, woven synthetic fabrics, PVA water transfer film, and wall coverings.

The following embodiments are contemplated. All combinations of features and embodiments are contemplated.

Embodiment 1: An ink composition comprising: a) a pigment present in an amount from 0.5 to 5 wt. % of the ink composition; b) a binder system present in an amount from 0.2 to 15 wt. % of the ink composition; c) a solvent system present in an amount from 1 to 99 wt. % of the ink composition; and d) optionally, an acid scavenger present in an amount from 0.05 to 1 wt. % of the ink composition.

Embodiment 2: The ink composition according Embodiment 1, wherein the acid scavenger is an epoxy resin.

Embodiment 3: The ink composition according Embodiment 1, wherein the ink composition is a yellow ink composition, a magenta ink composition, a cyan ink composition, a black ink composition, a light magenta ink composition, a white ink composition, or a light cyan ink composition.

Embodiment 4: The ink composition according Embodiment 1, wherein the pigment is at least one of Pigment Blue 1, Pigment Blue 15, Pigment Blue 15:1, Pigment Blue 15:3, Pigment Blue 15:4, Pigment Blue 15:6, Pigment Blue 16, Pigment Blue 17-1, Pigment Blue 22, Pigment Blue 22, Pigment Blue 27, Pigment Blue 28, Pigment Blue 29, Pigment Blue 36, and Pigment Blue 60.

Embodiment 5: The ink composition according Embodiment 1, wherein the pigment is at least one of Pigment Red 3, Pigment Red 5, Pigment Red 8, Pigment Red 9, Pigment Red 9:8, Pigment Red 19, Pigment Red 22, Pigment Red 31, Pigment Red 38, Pigment Red 43, Pigment Red 48:1, Pigment Red 48:2, Pigment Red 48:3, Pigment Red 48:4, Pigment Red 48:5, Pigment Red 49:1, Pigment Red 53:1, Pigment Red 57:1, Pigment Red 57:2, Pigment Red 58:4, Pigment Red 63:1, Pigment Red 81, Pigment Red 81:1, Pigment Red 81:2, Pigment Red 81:3, Pigment Red 81:4, Pigment Red 88, Pigment Red 104, Pigment Red 108, Pigment Red 112, Pigment Red 122, Pigment Red 123, Pigment Red 144, Pigment Red 146, Pigment Red 149, Pigment Red 166, Pigment Red 168, Pigment Red 169, Pigment Red 170, Pigment Red 177, Pigment Red 178, Pigment Red 179, Pigment Red 184, Pigment Red 185, Pigment Red 207, Pigment Red 208, Pigment Red 216, Pigment Red 224, Pigment Red 226, Pigment Red 257, Pigment Violet 3, Pigment Violet 19, Pigment Violet 23, Pigment Violet 29, Pigment Violet 30, Pigment Violet 37, Pigment Violet 50, Pigment Violet 88, Pigment Orange 13, Pigment Orange 16, Pigment Orange 20, or Pigment Orange 36.

Embodiment 6: The ink composition according to Embodiment 1, wherein the pigment is at least one of Pigment Yellow 55, Pigment Yellow 74, Pigment Yellow 79, Pigment Yellow 93, Pigment Yellow 110, Pigment Yellow 120, Pigment Yellow 128, Pigment Yellow 138C, Pigment Yellow 139, Pigment Yellow 150, Pigment Yellow 151, Pigment Yellow 155, Pigment Yellow 156, Pigment Yellow 175, Pigment Yellow 180, Pigment Yellow 185 and Pigment Yellow 213.

Embodiment 7: The ink composition according to Embodiment 1, wherein the pigment is at least one of Pigment Black 6, Pigment Black 7, Pigment Black 9, lamp or vegetable black, bone or ivory black, and furnace or channel black Embodiment 8: The ink composition according to any of Embodiments 1-7, wherein the binder system comprises at least two binders.

Embodiment 9: The ink composition according to any of Embodiments 1-8, wherein the binder system comprises at least one copolymer.

Embodiment 10; The ink composition according to any of Embodiments 1-9, wherein the binder system comprises a vinyl acetate copolymer and/or a methacrylate copolymer.

Embodiment 11: The ink composition according to any of Embodiments 1-10, wherein the solvent system comprises at least two solvents.

Embodiment 12: The ink composition according to any of Embodiments 1-11, wherein the solvent system comprises at least three solvents.

Embodiment 13: The ink composition according to any of Embodiments 1-12, wherein the solvent system comprises at least four solvents.

Embodiment 14: The ink composition according to any of Embodiments 1-13, wherein the solvent system comprises a diethylene glycol.

Embodiment 15: The ink composition according to any Embodiments 2-14, wherein the epoxy resin comprises 3,4-epoxycyclohexylmethyl-3,4-epoxycyclohexane carboxylate.

Embodiment 16: An ink set comprising at least a yellow ink composition, a magenta ink composition, a cyan ink composition, and a black ink composition, wherein at least one of the ink compositions comprises the ink composition according to any of Embodiments 1-15.

Embodiment 17: The ink set of Embodiment 1, wherein at least two of the ink compositions comprises the ink composition according to any of Embodiments 1-15.

Embodiment 18: The ink set of Embodiment 16, wherein at least three of the ink compositions comprises the ink composition according to any of Embodiments 1-15.

Embodiment 18: The ink set of Embodiment 16, wherein each of the yellow ink composition, the magenta ink composition, the cyan ink composition, and the black ink composition comprise the ink composition according to any of Embodiments 1-15.

Embodiment 19: A method of preparing the ink composition according to any of Embodiments 1-15, comprising: a) grinding pigments to form ground pigments having submicron particle size, b) combining the ground pigments with at least one dispersing resin to form a dispersed composition; c) reducing the size of the dispersed composition to be submicron; and d) combining the dispersed composition with a solvent system and a binder system.

Embodiment 20: A method of printing inkjet ink composition from an inkjet printer, comprising: a) providing at least one inkjet ink composition according to any of Embodiments 1-15 to an inkjet printer; and b) printing the ink composition onto a substrate; wherein the ink composition dries on the printed substrate within less than 8 hours.

The present disclosure will be better understood in view of the following non-limiting examples.

EXAMPLES

Example 1

A cyan inkjet ink composition was prepared having the components and concentrations shown in Table 1.

TABLE 1

Cyan Inkjet Ink Composition

| Component | Weight % |
|---|---|
| Phthalocyanine Blue 15:4 or 15:3 pigment | 0.5-5 |
| Vinyl chloride copolymer (86% vinyl chloride/14% vinyl acetate) | 0.1-5 |
| Methacrylate copolymer (Dianal TB-163) | 0.1-10 |
| Diethylene glycol ethyl methyl ether | 50-80 |
| γ-butyrolactone | 0.1-10 |
| Dipropylene glycol methyl ether | 1-20 |
| n-methyl pyrrolidone | 0.1-1 |
| 3,4-epoxycyclohexylmethyl-3,4-epoxycyclohexane carboxylate | 0.05-1 |

The inkjet ink composition was printed onto a substrate.

Example 2

A magenta inkjet ink composition was prepared having the components and concentrations shown in Table 2.

TABLE 2

Magenta Inkjet Ink Composition

| Component | Weight % |
|---|---|
| Pigment Red 122 | 0.5-5 |
| Vinyl chloride copolymer (86% vinyl chloride/14% vinyl acetate) | 0.1-5 |
| Methacrylate copolymer (Dianal TB-163) | 0.1-10 |
| Diethylene glycol ethyl methyl ether | 50-80 |
| γ-butyrolactone | 0.1-10 |
| Dipropylene glycol methyl Ether | 1-20 |
| n-methyl pyrrolidone | 0.1-1 |
| 3,4-epoxycyclohexylmethyl-3,4-epoxycyclohexane carboxylate | 0.05-1 |

The inkjet ink composition was printed onto a substrate.

Example 3

A yellow inkjet ink composition was prepared having the components and concentrations shown in Table 3.

TABLE 3

Yellow Inkjet Ink Composition

| Component | Weight % |
| --- | --- |
| Pigment Yellow 151 | 0.5-5 |
| Vinyl chloride copolymer (86% vinyl chloride/14% vinyl acetate) | 0.1-5 |
| Methacrylate copolymer (Dianal TB-163) | 0.1-10 |
| Diethylene glycol ethyl methyl ether | 50-80 |
| γ-butyrolactone | 0.1-10 |
| Dipropylene glycol methyl ether | 1-20 |
| n-methyl pyrrolidone | 0.1-1 |
| 3,4-epoxycyclohexylmethyl-3,4-epoxycyclohexane carboxylate | 0.05-1 |

The inkjet ink composition was printed onto a substrate.

Example 4

A black inkjet ink composition was prepared having the components and concentrations shown in Table 4.

TABLE 4

Black Inkjet Ink Composition

| Component | Weight % |
| --- | --- |
| Pigment Black 7 | 0.5-5 |
| Vinyl chloride copolymer (86% vinyl chloride/14% vinyl acetate) | 0.1-5 |
| Methacrylate copolymer (Dianal TB-163) | 0.1-10 |
| Diethylene glycol ethyl methyl ether | 50-80 |
| γ-butyrolactone | 0.1-10 |
| Dipropylene glycol methyl ether | 1-20 |
| n-methyl pyrrolidone | 0.1-1 |
| 3,4-epoxycyclohexylmethyl-3,4-epoxycyclohexane carboxylate | 0.05-1 |

The inkjet ink composition was printed onto a substrate.

Example 5

An inkjet ink set containing the ink compositions of Examples 1~4 were loaded into an inkjet printer and printed onto a substrate. The inks were then tested for time to lamination without failure, sustained jetting, nozzle latency/start-up from storage, and other parameters. Drying time for the ink set was less than 8 hours.

Comparative Example A

A slow drying ink composition was prepared comprising the components shown below in Table 5.

TABLE 5

Slow Drying Inkjet Ink Composition

| Component | Weight % |
| --- | --- |
| Pigment Black 7 | 2 |
| Vinyl chloride/vinyl acetate copolymer | 3 |
| Ethyl diglyme | 74.9 |
| γ-butyrolactone | 10 |
| Tetraglyme | 10 |
| Cycloaliphatic epoxide | 0.1 |

The ink composition was then tested for time to lamination without failure, sustained jetting, nozzle latency/start-up from storage, and other parameters. Drying time for the ink set was greater than 8 hours.

These and other modifications and variations to the present disclosure may be practiced by those of ordinary skill in the art without departing from the spirit and scope of the present disclosure, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the disclosure as further described in such appended claims. Therefore, the spirit and scope of the appended claims should not be limited to the exemplary description of the versions contained herein.

What is claimed is:

1. An ink composition comprising:
    a pigment present in an amount from 0.5 to 5 wt. % of the ink composition;
    a binder system present in an amount from 0.2 to 15 wt. % of the ink composition;
    a solvent system present in an amount from 1 to 99 wt. % of the ink composition; and
    an acid scavenger present in an amount from 0.05 to 1 wt. % of the ink composition;
    wherein the acid scavenger is an epoxy resin; and
    wherein the epoxy resin comprises 3,4-epoxycyclohexyl-methyl-3,4-epoxycyclohexane carboxylate.

2. The ink composition of claim 1, wherein the ink composition is a yellow ink composition, a magenta ink composition, a cyan ink composition, a black ink composition, a light magenta ink composition, a white ink composition, or a light cyan ink composition.

3. The ink composition of claim 1, wherein the pigment is at least one of Pigment Blue 1, Pigment Blue 15, Pigment Blue 15:1, Pigment Blue 15:3, Pigment Blue 15:4, Pigment Blue 15:6, Pigment Blue 16, Pigment Blue 17-1, Pigment Blue 22, Pigment Blue 27, Pigment Blue 28, Pigment Blue 29, Pigment Blue 36, and Pigment Blue 60.

4. The ink composition of claim 1, wherein the pigment is at least one of Pigment Red 3, Pigment Red 5, Pigment Red 8, Pigment Red 9, Pigment Red 9:8, Pigment Red 19, Pigment Red 22, Pigment Red 31, Pigment Red 38, Pigment Red 43, Pigment Red 48:1, Pigment Red 48:2, Pigment Red 48:3, Pigment Red 48:4, Pigment Red 48:5, Pigment Red 49:1, Pigment Red 53:1, Pigment Red 57:1, Pigment Red 57:2, Pigment Red 58:4, Pigment Red 63:1, Pigment Red 81, Pigment Red 81:1, Pigment Red 81:2, Pigment Red 81:3, Pigment Red 81:4, Pigment Red 88, Pigment Red 104, Pigment Red 108, Pigment Red 112, Pigment Red 122, Pigment Red 123, Pigment Red 144, Pigment Red 146, Pigment Red 149, Pigment Red 166, Pigment Red 168, Pigment Red 169, Pigment Red 170, Pigment Red 177, Pigment Red 178, Pigment Red 179, Pigment Red 184, Pigment Red 185, Pigment Red 207, Pigment Red 208, Pigment Red 216, Pigment Red 224, Pigment Red 226, Pigment Red 257, Pigment Violet 3, Pigment Violet 19, Pigment Violet 23, Pigment Violet 29, Pigment Violet 30, Pigment Violet 37, Pigment Violet 50, Pigment Violet 88, Pigment Orange 13, Pigment Orange 16, Pigment Orange 20, and Pigment Orange 36.

5. The ink composition of claim 1, wherein the pigment is at least one of Pigment Yellow 55, Pigment Yellow 74, Pigment Yellow 79, Pigment Yellow 93, Pigment Yellow 110, Pigment Yellow 120, Pigment Yellow 128, Pigment Yellow 138C, Pigment Yellow 139, Pigment Yellow 150, Pigment Yellow 151, Pigment Yellow 155, Pigment Yellow 156, Pigment Yellow 175, Pigment Yellow 180, Pigment Yellow 185 and Pigment Yellow 213.

6. The ink composition of claim 1, wherein the pigment is at least one of Pigment Black 6, Pigment Black 7, Pigment Black 9, lamp or vegetable black, bone or ivory black, and furnace or channel black.

7. The ink composition of claim 1, wherein the binder system comprises at least two binders.

8. The ink composition of claim 1, wherein the binder system comprises at least one copolymer.

9. The ink composition of claim 1, wherein the binder system comprises at least one polymer selected from the group consisting of a vinyl acetate copolymer, a methacrylate copolymer, and combinations thereof.

10. The ink composition of claim 1, wherein the solvent system comprises at least two solvents.

11. The ink composition of claim 1, wherein the solvent system comprises at least three solvents.

12. The ink composition of claim 1, wherein the solvent system comprises at least four solvents.

13. The ink composition of claim 1, wherein the solvent system comprises a diethylene glycol.

14. An ink set comprising at least a yellow ink composition, a magenta ink composition, a cyan ink composition, and a black ink composition, wherein at least one of the ink compositions comprises the ink composition of claim 1.

15. The ink set of claim 14, wherein at least two of the ink compositions comprises the ink composition of claim 1.

16. The ink set of claim 14, wherein at least three of the ink compositions comprises the ink composition of claim 1.

17. The ink set of claim 14, wherein each of the yellow ink composition, the magenta ink composition, the cyan ink composition, and the black ink composition comprise the ink composition of claim 1.

18. A method of preparing the ink composition of claim 1, comprising:
grinding pigments to form ground pigments having submicron particle size;
combining the ground pigments with at least one dispersing resin to form a dispersed composition;
reducing the size of the dispersed composition to be submicron; and
combining the dispersed composition with a solvent system and a binder system.

19. A method of printing inkjet ink composition from an inkjet printer, comprising:
providing at least one inkjet ink composition of claim 1 to an inkjet printer; and
printing the ink composition onto a substrate;
wherein the ink composition dries on the printed substrate within less than 8 hours.

* * * * *